United States Patent
Zhu et al.

(10) Patent No.: US 11,647,410 B2
(45) Date of Patent: May 9, 2023

(54) SMTC COMPLIANT SEARCH AND MEASUREMENT SCHEDULING

(71) Applicant: QUALCOMM Incorporated, San Diego, CA (US)

(72) Inventors: Jun Zhu, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 16/909,482

(22) Filed: Jun. 23, 2020

(65) Prior Publication Data

US 2020/0413276 A1    Dec. 31, 2020

Related U.S. Application Data

(60) Provisional application No. 62/868,444, filed on Jun. 28, 2019.

(51) Int. Cl.
  *H04W 24/10*    (2009.01)
(52) U.S. Cl.
  CPC .................. *H04W 24/10* (2013.01)
(58) Field of Classification Search
  CPC .............. H04W 24/10; H04W 36/0088; H04L 5/0053; H04L 5/0078; H04L 5/0094
  See application file for complete search history.

(56) References Cited

U.S. PATENT DOCUMENTS

| | | | |
|---|---|---|---|
| 2017/0251518 A1* | 8/2017 | Agiwal | H04W 76/28 |
| 2017/0302355 A1* | 10/2017 | Islam | H04W 72/1284 |
| 2019/0239106 A1* | 8/2019 | Cui | H04W 56/001 |
| 2020/0120622 A1* | 4/2020 | Yoon | H04J 11/00 |
| 2020/0214014 A1* | 7/2020 | Wang | H04L 5/0051 |
| 2020/0344019 A1* | 10/2020 | Da Silva | H04L 1/203 |
| 2021/0076226 A1* | 3/2021 | Nakayama | H04B 7/0617 |
| 2021/0112622 A1* | 4/2021 | Koskela | H04W 72/1284 |
| 2021/0266898 A1* | 8/2021 | Cha | H04B 7/086 |

OTHER PUBLICATIONS

Huawei, "On requirements for L1-RSRP measurement for beam reporting", 3GPP TSG-RAN WG4 Meeting #89, "R4-1815177", Spokane, US, Nov. 12-16, 2018 (Year: 2018).*

(Continued)

*Primary Examiner* — Walli Z Butt
*Assistant Examiner* — Thad N Defauw
(74) *Attorney, Agent, or Firm* — Harrity & Harrity, LLP

(57) ABSTRACT

Various aspects of the present disclosure generally relate to wireless communication. In some aspects, a user equipment (UE) may receive synchronization signal block (SSB) measurement time configuration (SMTC) information that identifies a periodicity of a plurality of SSB measurement occasions. The UE may perform at least one of a radio resource management (RRM) operation or a beam management (BM) operation on a group of SSBs based at least in part on whether the plurality of SSB measurement occasions overlap all SSBs of the group of SSBs. Numerous other aspects are provided.

30 Claims, 8 Drawing Sheets

(56) References Cited

OTHER PUBLICATIONS

Huawei, et al., "CR on L1-RSRP Measurement Requirements (Section 9.5.4)", 3GPP Draft, 3GPP TSG-RAN4 Meeting #90bis, R4-1904710 Revised CR on L1-RSRP Requirements V2, 3rd Generation Partnership Project (3GPP), Mobile Competence Centre, 650, Route Des Lucioles, F-06921 Sophia-Antipolis Cedex, France, vol. RAN WG4, No. Xi 'An, China, Apr. 8, 2019-Apr. 12, 2019, Apr. 15, 2019 (Apr. 15, 2019), XP051715032, 5 Pages, Retrieved from the Internet: URL: http://www.3gpp.org/ftp/tsg%5Fran/WG4%5FRadio/TSGR4%5F90Bis/Docs/R4%2D1904710%2Ezip, [retrieved on Apr. 15, 2019], Chapter 9.5.4.

Huawei, et al., "Discussion on Remaining Issues in L1-RSRP Measurement", 3GPP Draft, 3GPP TSG-RAN WG4 Meeting #91, R4-1906544, 3rd Generation Partnership Project (3GPP), Mobile Competence Centre, 650, Route Des Lucioles, F-06921 Sophia-Antipolis Cedex, France, vol. RAN WG4, No. Reno, US, May 13, 2019-May 17, 2019, May 13, 2019(May 13, 2019), XP051733455, pp. 1-5, Retrieved from the Internet: URL: http://www.3gpp.org/ftp/Meetings%5F3GPP%5FSYNC/RAN4/Docs/R4%2D1906544%2Ezip, [retrieved on May 13,2019], chapters 1. 2.

Huawei, et al., "On Requirements for L1-RSRP Measurement for beam Reporting", 3GPP Draft, R4-1815177, 3GPP TSG-RAN WG4 Meeting #89, 3rd Generation Partnership Project (3GPP), Mobile Competence Centre, 650, Route Des Lucioles, F-06921 Sophia-Antipolis Cedex, France, vol. RAN WG4, No. Spokane, US, Nov. 12, 2018-Nov. 16, 2018, Nov. 11, 2018 (Nov. 11, 2018), XP051559497, pp. 1-6, Retrieved from the Internet: URL: http://www.3gpp.org/ftp/Meetings%5F3GPP%5FSYNC/RAN4/Docs/R4%2D1815177%2Ezip, [retrieved on Nov. 11, 2018], Chapters 1. 2.

International Search Report and Written Opinion—PCT/US2020/039319—ISAEPO—Sep. 16, 2020.

Qualcomm Incorporated: "UE Adaptation to the Traffic and UE Power Consumption Characteristics", 3GPP Draft, 3GPP TSG-RAN WG1 Ad-Hoc Meeting 1901, R1-1900911 UE Adaptation for Power Saving, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593757, pp. 1-24 Retrieved from the Internet: URL: http://www.3gpp.org/ftp/tsg%5Fran/WG1%5FRL1/TSGR1%5FAH/NR%5FAH%5F1901/Docs/R1%2D1900911%2Ezip, [retrieved on Jan. 20, 2019], Chapters 1. 2.

\* cited by examiner

SMTC COMPLIANT SEARCH AND MEASUREMENT SCHEDULING

CROSS-REFERENCE TO RELATED APPLICATION

This patent application claims priority to U.S. Provisional Patent Application No. 62/868,444, filed on Jun. 28, 2019, entitled "SMTC COMPLIANT SEARCH AND MEASUREMENT SCHEDULING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for synchronization signal block (SSB) measurement time configuration (SMTC) compliant search and measurement scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving synchronization signal block (SSB) measurement time configuration (SMTC) information that identifies a periodicity of a plurality of SSB measurement occasions; and performing at least one of a radio resource management (RRM) operation or a beam management (BM) operation on a group of SSBs based at least in part on whether the plurality of SSB measurement occasions overlap all SSBs of the group of SSBs.

In some aspects, a UE for wireless communication may include memory and one or more processors operatively coupled to the memory. The memory and the one or more processors may be configured to receive SMTC information that identifies a periodicity of a plurality of SSB measurement occasions; and perform at least one of an RRM operation or a BM operation on a group of SSBs based at least in part on whether the plurality of SSB measurement occasions overlap all SSBs of the group of SSBs.

In some aspects, a non-transitory computer-readable medium may store one or more instructions for wireless communication. The one or more instructions, when executed by one or more processors of a UE, may cause the one or more processors to: receive SMTC information that identifies a periodicity of a plurality of SSB measurement occasions; and perform at least one of an RRM operation or a BM operation on a group of SSBs based at least in part on whether the plurality of SSB measurement occasions overlap all SSBs of the group of SSBs.

In some aspects, an apparatus for wireless communication may include means for receiving SMTC information that identifies a periodicity of a plurality of SSB measurement occasions; and means for performing at least one of a RRM operation or a BM operation on a group of SSBs based at least in part on whether the plurality of SSB measurement occasions overlap all SSBs of the group of SSBs.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
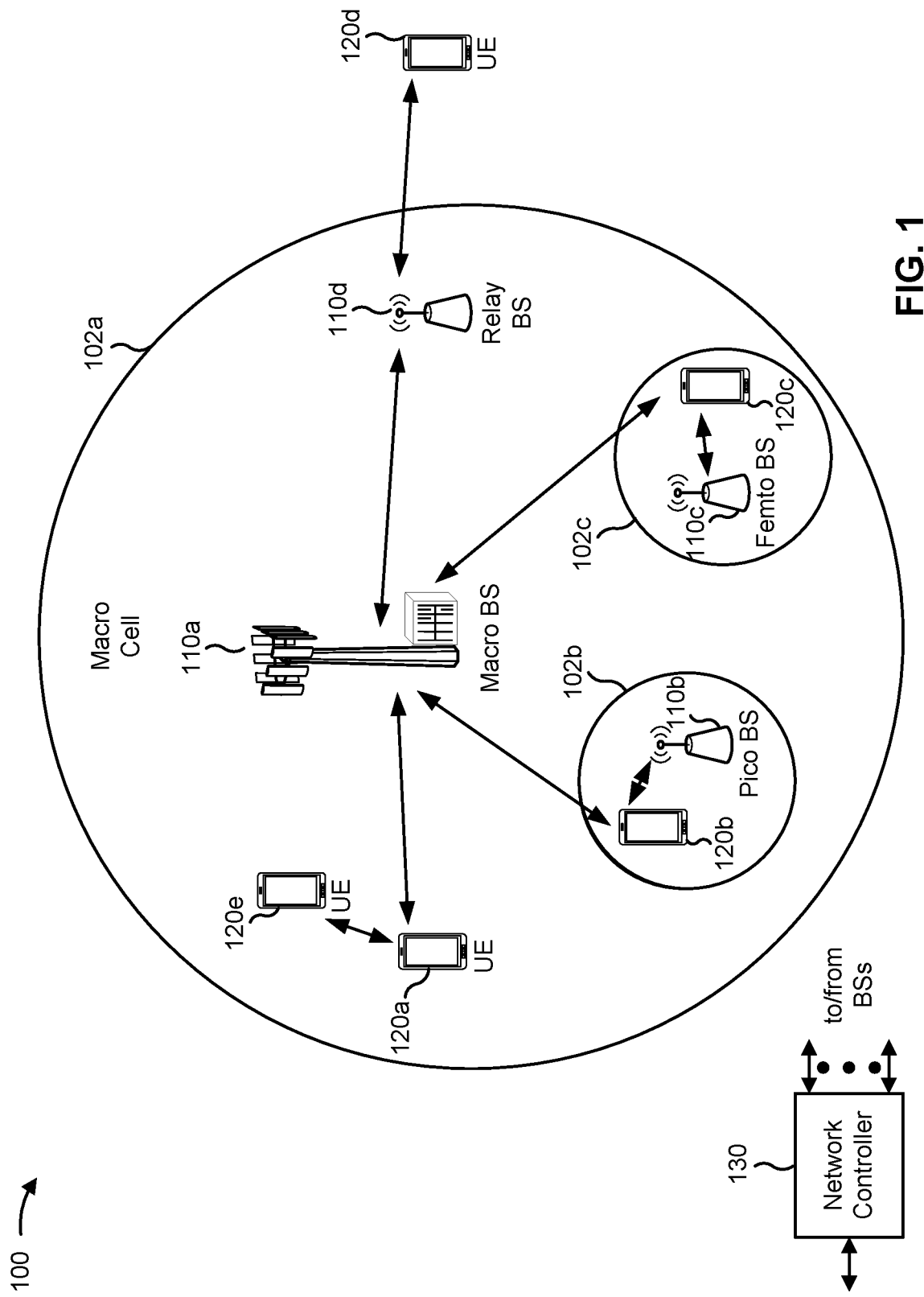
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
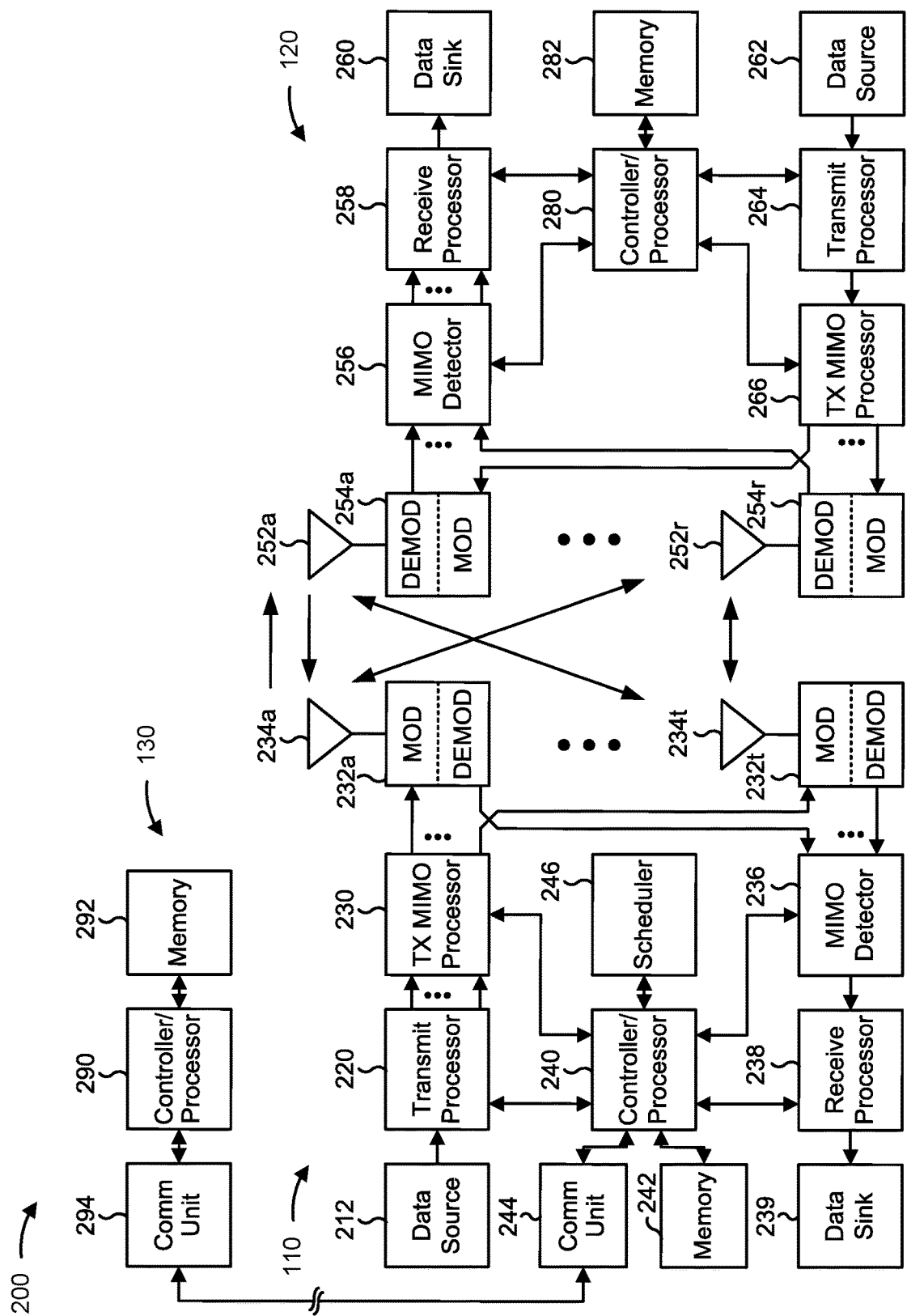
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with SMTC compliant search and measurement scheduling, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 700 of FIG. 7, and/or other processes as described herein. A scheduler 246 may schedule UEs for data transmission on the downlink and/or uplink.

In some aspects, UE 120 may include means for receiving synchronization signal block (SSB) measurement time configuration (SMTC) information that identifies a periodicity of a plurality of SSB measurement occasions; means for performing at least one of a radio resource management (RRM) operation or a beam management (BM) operation on a group of SSBs based at least in part on whether the plurality of SSB measurement occasions overlap all SSBs of the group of SSBs; means for performing one of the RRM operation or the BM operation on each SSB of the group of SSBs; means for identifying one or more SSBs that are treated as non-overlapped with the plurality of SSB measuring occasions; means for performing the RRM operation on one or more SSBs that are overlapped with the plurality of SSB measurement occasions; means for performing the BM operation on the one or more SSBs that are treated as non-overlapped with the plurality of SSB measurement occasions; means for receiving an SSB, of the group of SSBs, that is non-overlapped with the plurality of SSB measurement occasions using a shared channel beam on a serving cell of the UE; means for performing the BM operation outside of a connected-mode discontinuous reception (C-DRX) ON duration; means for performing a beam tracking operation during the C-DRX ON duration; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
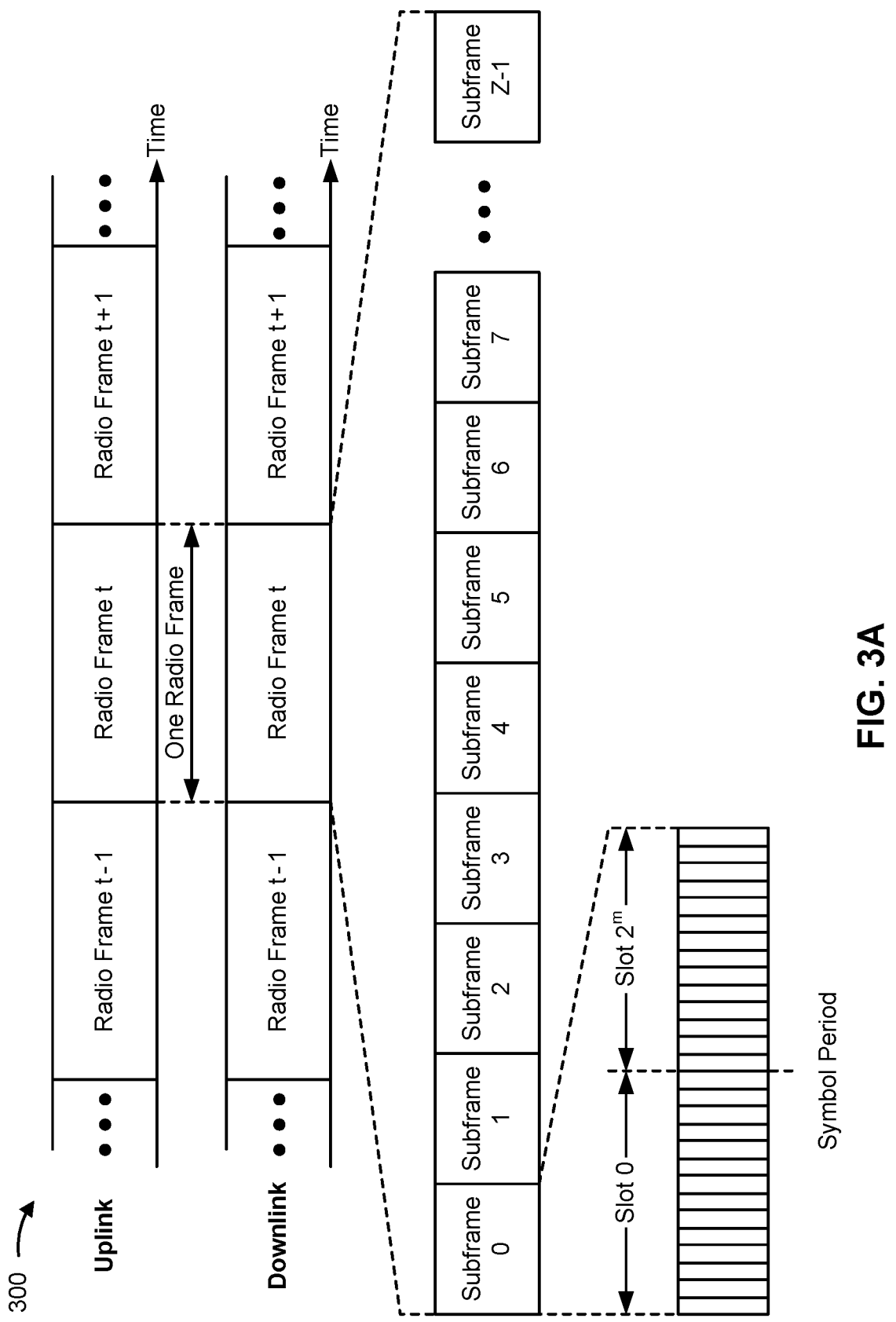
FIG. 3A shows an example frame structure for frequency division duplexing (FDD) in a telecommunications system (e.g., NR).

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
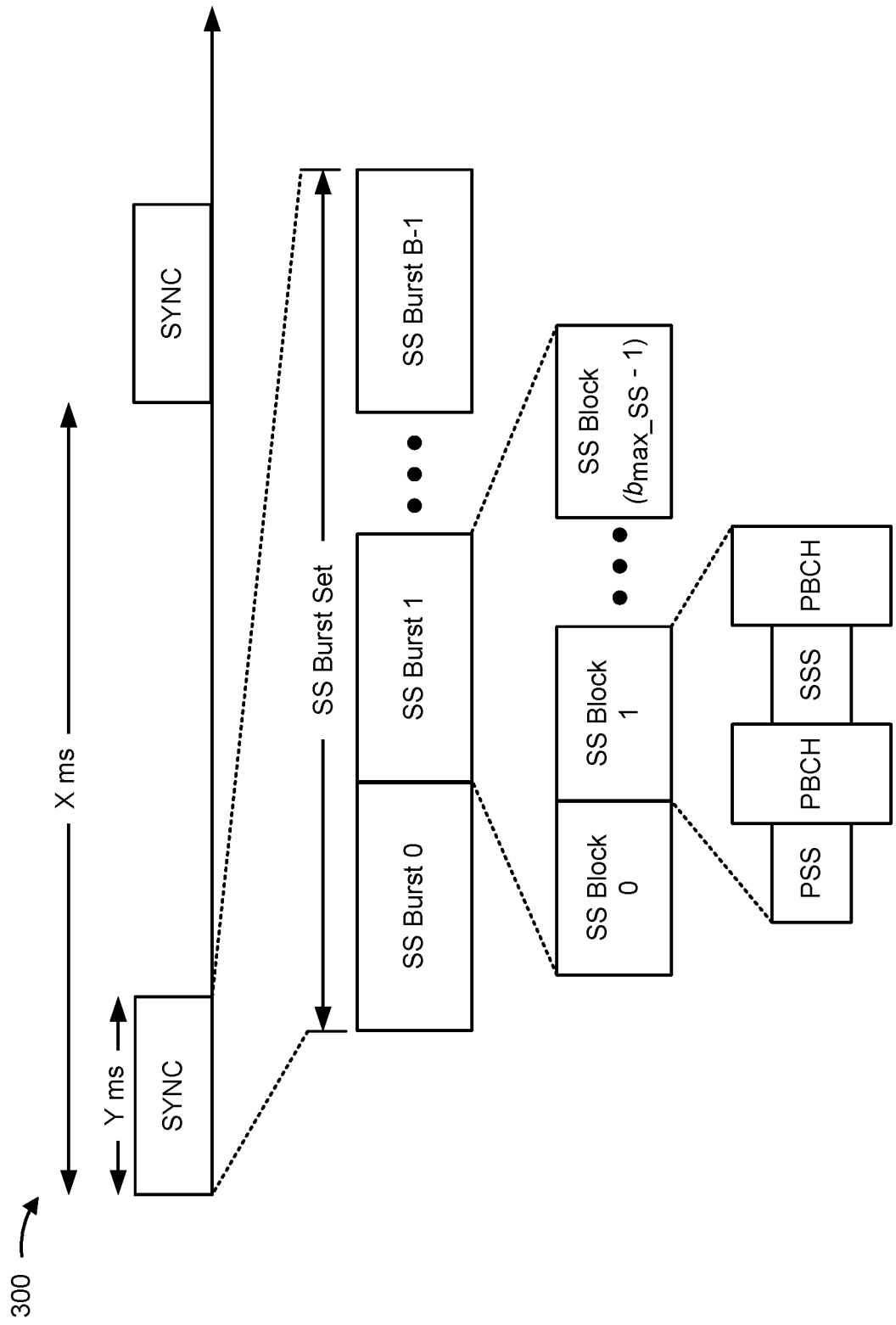
FIG. 3B is a block diagram conceptually illustrating an example SS hierarchy, which is an example of a synchronization communication hierarchy.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have an SS burst set (SSBS) periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
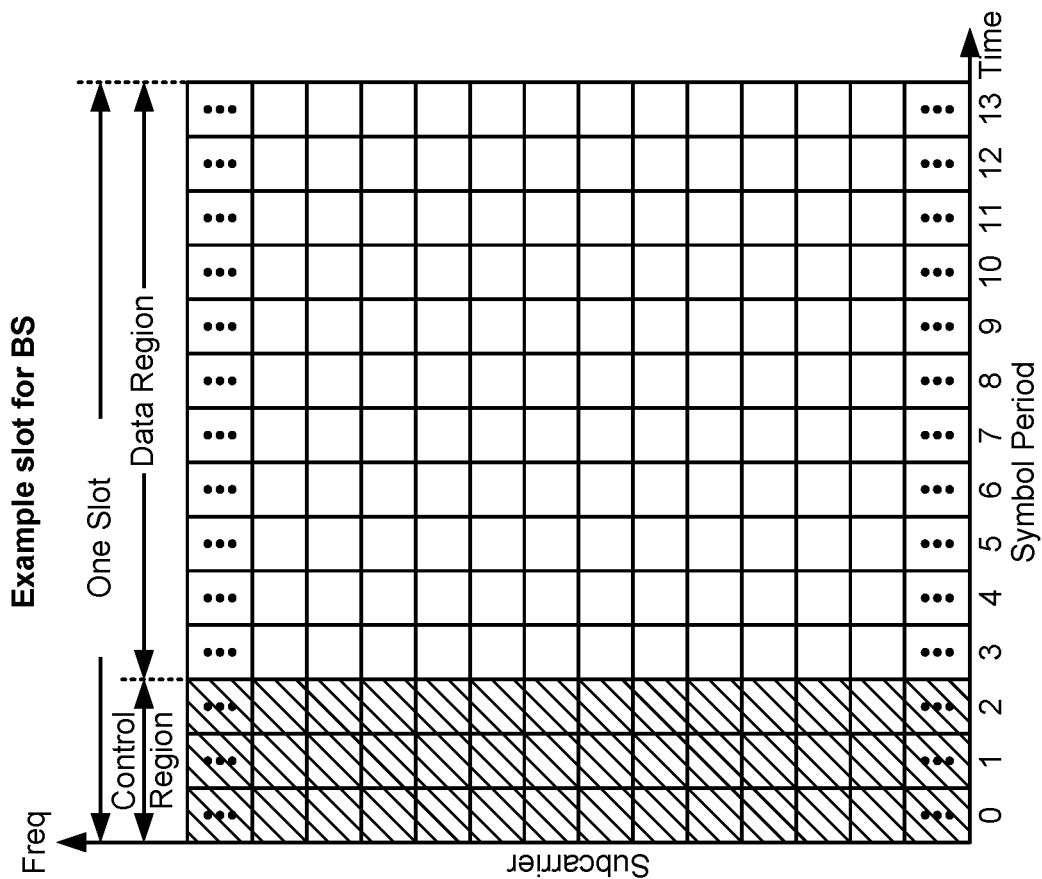
FIG. 4 shows an example slot format with a normal cyclic prefix.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 4 is provided as an example. Other examples may differ from what is described with regard to FIG. 4.

A UE may perform various synchronization and/or beam management (BM) operations based at least in part on an SSB. For example, the UE may perform a radio resource management (RRM) operation such as a neighbor cell search, a BM operation such as a serving cell beam sweeping operation, and/or the like. As indicated above, SSBs may be provided in groups, which may be referred to as SS bursts or SS burst sets. Furthermore, an SSBS may have a periodicity indicating a time spacing of the SSBs of the SSBS.

An SSB measurement time configuration (SMTC) may identify a periodicity, a time length, and/or an offset of SSB measurement occasions. An SSB that occurs within an SSB measurement occasion may be protected, meaning that no data traffic is frequency division multiplexed with the SSB within the SSB measurement occasion. Outside of the SSB measurement occasion, traffic may be frequency division multiplexed with an SSB. The protected nature of an SSB within the SSB measurement occasion may enable RRM operations that would otherwise be difficult or impossible while receiving data traffic that is multiplexed with the SSB.

When a UE camps on a serving cell and enters connected mode, the UE may receive one or more SSBS configurations that indicate resources for SSBs in the time domain and in the frequency domain. In some cases, there may be multiple SS rasters within the bandwidth of a particular component carrier. Some specifications may constrain the selection of the time and/or frequency resources. For example, a radio link monitoring (RLM) SSB (e.g., an SSB used for radio link monitoring or radio resource management) and an SMTC SSB may be aligned in the frequency domain, but may fully or partially overlap in the time domain, as described in connection with FIG. 6.

SMTCs may vary in different deployments. For example, one cell may use a first SMTC periodicity and another cell may use a second SMTC periodicity. Because of the variability of the SMTCs, some SSBSs may fully overlap SSB measurement occasions, whereas other SSBSs may partially overlap or may not overlap SSB measurement occasions. It may be desirable to perform RRM operations on SSBs within SSB measurement occasions so that reception of data traffic is not impacted by the RRM operation. However, if all SSBs are within SSB measurement occasions, and if the UE performs RRM operations on only SSBs within SSB measurement occasions, then the UE may never perform a BM operation. Also, in some cases, the UE may not benefit from performing RRM operations on every SSB (when every SSB is within an SSB measurement occasion), since the neighbor cell state of the UE may not change from SSB to SSB, particularly when the UE is stationary.

Some techniques and apparatuses described herein provide scheduling of search and measurement (e.g., an RRM operation such as a neighbor cell search, a BM operation such as beam sweeping or serving cell beam management, and/or the like) based at least in part on an SMTC configuration and an SSBS configuration of a UE. For example, some techniques and apparatuses described herein provide for RRM operations and/or BM operations to be performed when a group of SSBs are fully overlapped with SSB measurement windows. Some techniques and apparatuses described herein provide for RRM operations to be performed on SSBs that overlap SSB measurement windows and for BM operations to be performed on other SSBs. Furthermore, some techniques and apparatuses described herein provide methods for handling fully overlapped SSBs, such as scaling an SMTC periodicity and treating certain SSBs as non-overlapped SSBs based at least in part on the scaled SMTC periodicity. Thus, flexibility of the UE with regard to handling different SMTC periodicities is improved. Furthermore, downlink performance of the UE may be improved by reducing interruption to data traffic reception associated with RRM operations or beam sweeping operations outside of SSB measurement windows.

Figure 5:
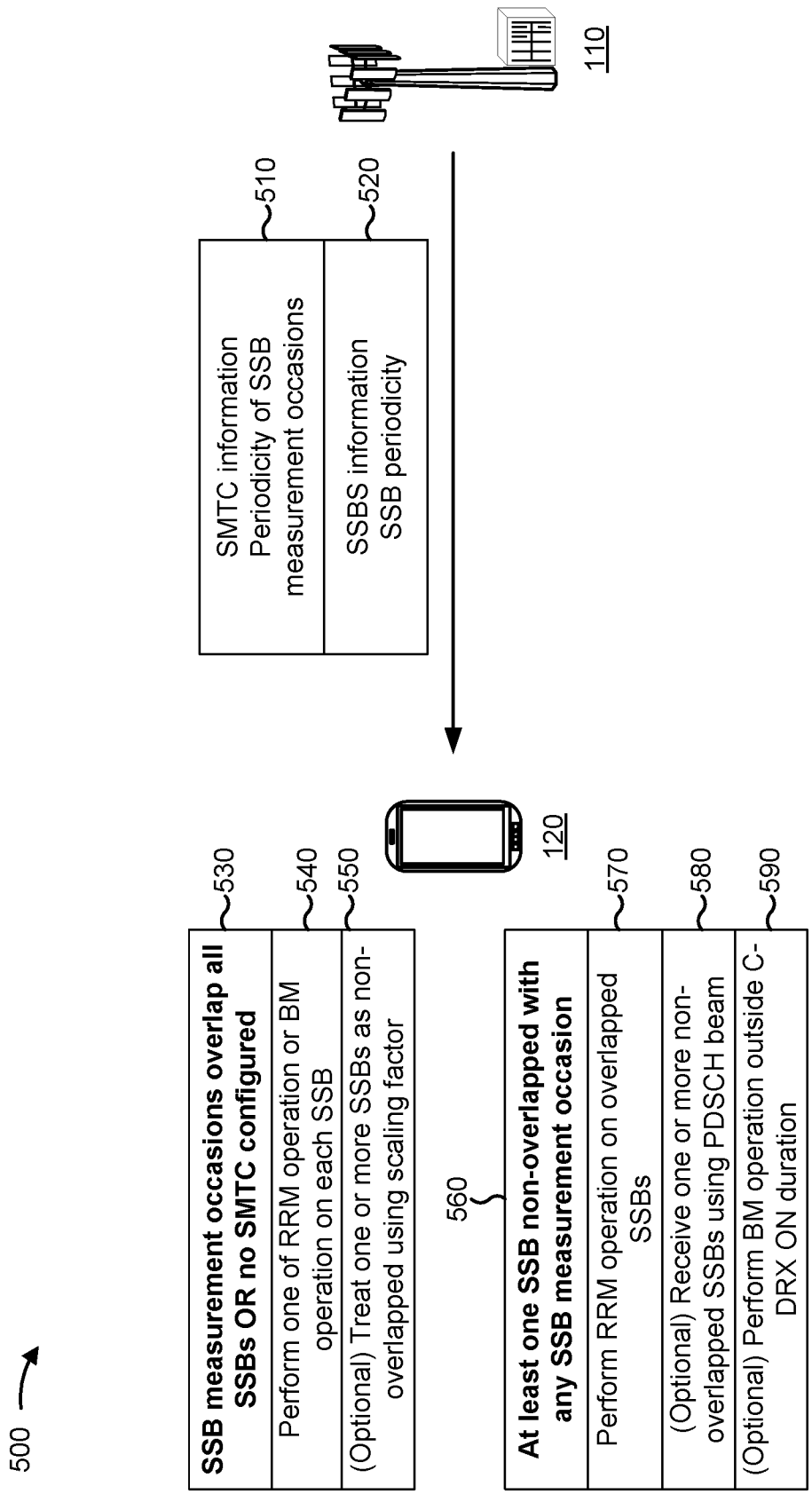
FIG. 5 is a diagram illustrating an example of SMTC compliant search and measurement scheduling, in accordance with various aspects of the present disclosure.

FIG. 5 is a diagram illustrating an example 500 of SMTC compliant search and measurement scheduling, in accordance with various aspects of the present disclosure. As shown, FIG. 5 includes a UE 120 and a BS 110. The UE 120 may be connected to the BS 110. For example, the BS 110 may provide a serving cell to which the UE 120 is connected.

As shown by reference number 510, the BS 110 may transmit SMTC information to the UE 120. As further shown, the SMTC information may identify a periodicity of SSB measurement occasions. In some aspects, the SMTC information may include other information, such as information identifying a length of an SSB measurement occasion, information identifying a time offset of an SSB measurement occasion (e.g., relative to a reference time), and/or the like. An SSB measurement occasion is a time window in which an SSB is not frequency division multiplexed with data traffic. If an SSB measurement occasion at least partially overlaps an SSB, then data traffic may not be frequency division multiplexed with the SSB. In some aspects, no SMTC may be configured (e.g., the BS 110 may not transmit SMTC information to the UE 120). This case is described in more detail elsewhere herein.

As shown by reference number 520, the BS 110 may transmit SSBS information that identifies an SSB periodicity. For example, the SSBS information may identify a time spacing between SSBs of the SSBS. In some aspects, the SSBS may be referred to herein as a group of SSBs.

In some aspects, the SSB periodicity may be the same as the periodicity of the SSB measurement occasions. In this case, each SSB of the SSBS may at least partially overlap an SSB measurement occasion. Thus, the SSBS may be referred to as fully overlapping the SSB measurement occasions. In some aspects, the SSB periodicity may be different than the periodicity of the SSB measurement occasions. In this case, one or more SSBs of the SSBS may not overlap an SSB measurement occasion. Thus, the SSBS may be referred to as partially overlapping the SSB measurement occasions. Some techniques and apparatuses described herein provide scheduling of RRM operations and BM operations based at least in part on the SSBS partially overlapping the SSB measurement occasion or fully overlapping the SSB measurement occasion.

As shown by reference number 530, in some aspects, the SSB measurement occasions may overlap all SSBs of the SSBS, or no SMTC may be configured. In these cases, as shown by reference number 540, the UE 120 may perform one of the RRM operation or the BM operation on each SSB. For example, the UE 120 may select one of the RRM operation or the BM operation, and may perform the selected operation. In some aspects, the UE 120 may perform the RRM operation for some SSBs, and may perform the BM operation for other SSBs. For example, the UE 120 may alternate between the RRM operation and the BM operation, may perform the RRM operation for every Nth SSB (where N is a positive integer), may perform the RRM operation based at least in part on a trigger condition, and/or the like.

As shown by reference number 550, in some aspects, the UE 120 may treat one or more SSBs as non-overlapped. For example, when all SSBs overlap SSB monitoring occasions, the UE 120 may apply a scaling factor to the SMTC periodicity such that some SSB monitoring occasions are disregarded. As an example, for a scaling factor of two, the UE 120 may skip every other SSB monitoring occasion, and may treat SSBs that overlap the skipped SSB monitoring occasions as non-overlapped SSBs. In this case, the UE 120 may perform the RRM operation on overlapped SSBs, and may perform a BM operation, such as a serving-cell only beam sweeping operation, on SSBs that are treated as non-overlapped. Thus, the UE 120 may perform RRM operations and BM operations for overlapped SSBs using a scaling factor, which reduces the likelihood of performing unnecessary RRM operations, thereby conserving UE resources.

As shown by reference number 560, in some aspects, at least one SSB may be non-overlapped with any SSB measurement occasion. This is illustrated, for example, by the non-hatched blocks shown in SSB arrangement 630 of FIG. 6. In this case, as shown by reference number 570, the UE 120 may perform the RRM operation on SSBs that overlap SSB measurement occasions. In some aspects, the UE 120 may perform a BM operation on SSBs that do not overlap SSB measurement occasions.

In some aspects, as shown by reference number 580, the UE 120 may receive one or more non-overlapped SSBs using a PDSCH beam. For example, when an SSB does not overlap an SSB measurement occasion, the UE 120 may receive the SSB using a PDSCH beam. This may reduce interruption of data traffic that is multiplexed with the SSB. In some aspects, the UE 120 may receive particular SSBs using the PDSCH beam. For example, the UE 120 may receive SSBs for radio link management (RLM), beam failure detection (BFD), beam failure recovery (BFR), and/or the like using the PDSCH beam. In such a case, the UE 120 may not perform beam sweeping or RRM on the SSBs, since the SSBs may be multiplexed with other traffic. Thus, the UE 120 may receive SSBs useful for operation of the UE 120 without interrupting traffic that may be multiplexed with the SSBs.

In some aspects, as shown by reference number 590, the UE 120 may perform a BM operation outside of a connected-mode discontinuous reception (C-DRX) ON duration of the UE 120. For example, a C-DRX cycle of the UE 120 may have OFF durations, in which the UE 120 is dormant and awaiting paging, and ON durations, in which the UE 120 receives downlink traffic from the BS 110. The C-DRX cycle may improve battery performance of the UE 120. In some aspects, the UE 120 may perform a BM operation, such as a beam sweeping operation, in the OFF duration of the C-DRX cycle (e.g., outside of the ON duration of the C-DRX cycle of the UE 120). By performing the BM operation in the OFF duration of the UE 120, the UE 120 may reduce the likelihood that data traffic is multiplexed with the SSB, since data traffic may not be scheduled for the UE 120 in the OFF duration of the C-DRX cycle. Thus, interruption to data traffic may be reduced, thereby improving throughput of the UE 120.

As indicated above, FIG. 5 is provided as an example. Other examples may differ from what is described with respect to FIG. 5.

Figure 6:
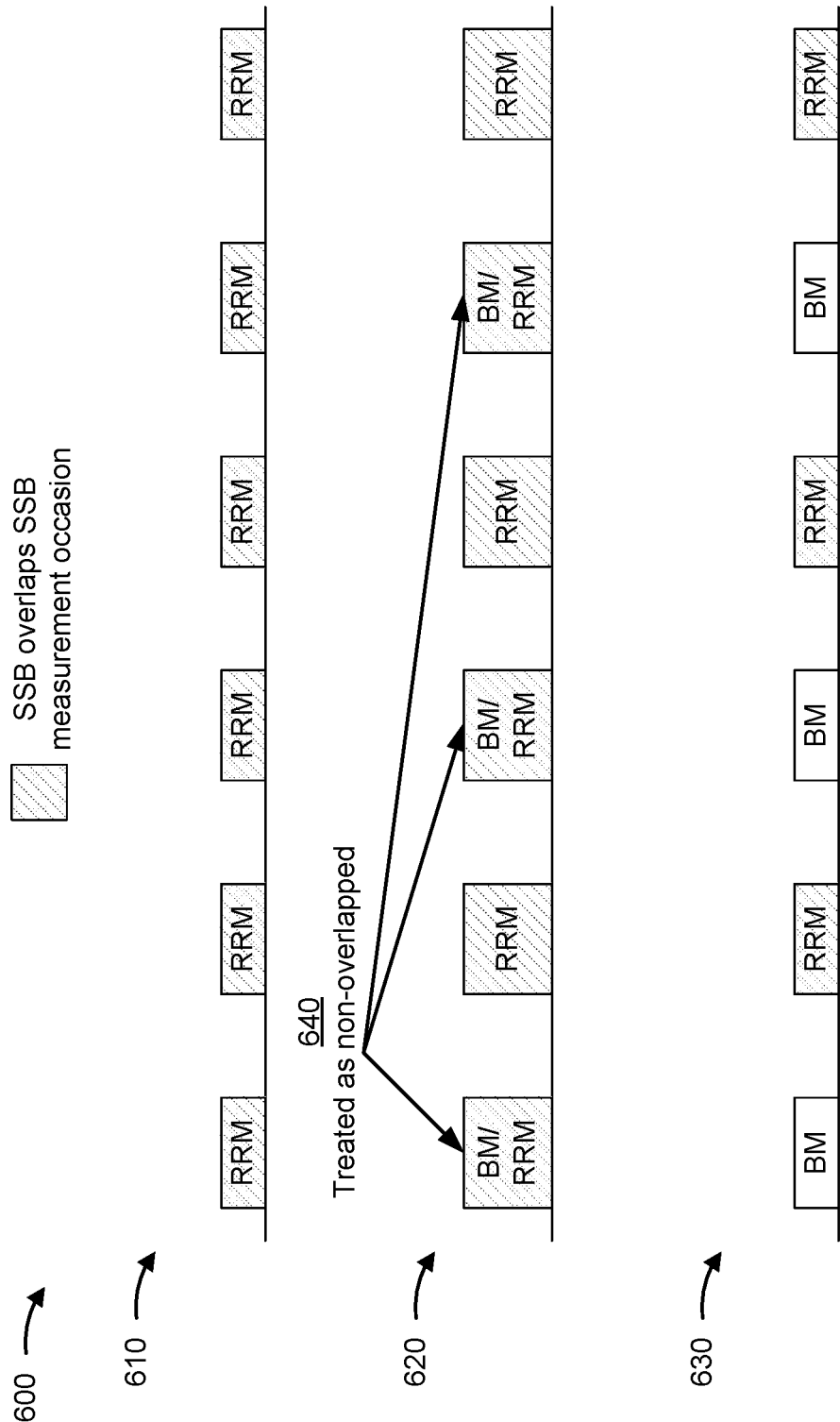
FIG. 6 is a diagram illustrating examples of fully overlapped and partially overlapped SSBs, in accordance with various aspects of the present disclosure.

FIG. 6 is a diagram illustrating examples 600 of fully overlapped and partially overlapped SSBs, in accordance with various aspects of the present disclosure. SSBs are shown by rectangles in FIG. 6. The horizontal axis represents time. Diagonal hatching indicates an SSB that overlaps with an SSB measurement occasion. Each of SSB arrangements 610, 620, and 630 is separate and independent from each other. In other words, the SSB arrangements 610, 620, and 630 may represent three separate examples, rather than a single example. SSB arrangement 610 represents a fully overlapped group of SSBs, SSB arrangement 620 represents a fully overlapped group of SSBs wherein some SSBs are treated as non-overlapped SSBs, and SSB arrangement 630 represents a partially overlapped group of SSBs.

For example, SSB arrangement 610 may represent a case wherein the periodicity of the SSBS and the periodicity of the SSB measurements occasions are aligned so that each SSB overlaps an SSB measurement occasion. As shown, in this case, a UE (e.g., UE 120) may perform an RRM measurement on each SSB (since each SSB overlaps an SSB measurement occasion). However, this may lead to degraded BM performance of the UE.

In SSB arrangement 620, examples of SSBs that a UE might treat as non-overlapped are shown by reference number 640. In this case, the UE may use a scaling factor of two, since every other overlapped SSB is treated as non-overlapped. It can be seen that the UE may perform either a BM operation or an RRM operation on each SSB that is treated as non-overlapped. For example, the UE may perform BM operations (e.g., a beam sweeping operation, a serving-cell-only beam sweeping operation, and/or the like) on the SSBs that are treated as non-overlapped, and may perform RRM operations on the SSBs that are treated as overlapped. Similarly, in SSB arrangement 630, the UE may perform BM operations on the non-overlapped SSBs (shown without diagonal hatching), and may perform RRM operations on overlapped SSBs. In some aspects, for SSB arrangement 630, the UE may track one or more SSBs (e.g., RLM SSBs, BFD SSBs, BFR SSBs, and/or the like) using a PDSCH beam on the non-overlapped SSBs, and may perform an RRM operation on overlapped SSBs.

As indicated above, FIG. 6 is provided as one or more examples. Other examples may differ from what is described with respect to FIG. 6.

Figure 7:
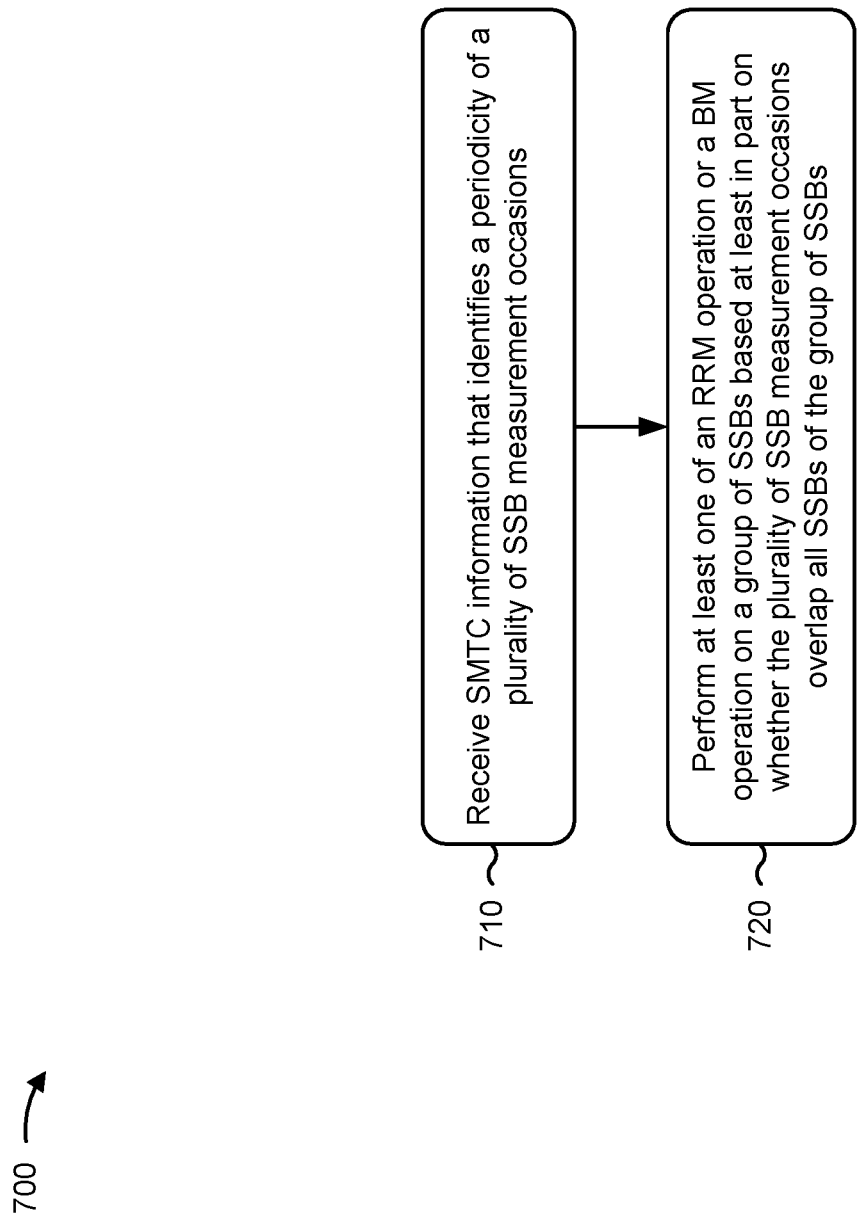
FIG. 7 is a diagram illustrating an example process performed, for example, by a user equipment, in accordance with various aspects of the present disclosure.

FIG. 7 is a diagram illustrating an example process 700 performed, for example, by a user equipment, in accordance with various aspects of the present disclosure. Example process 700 is an example where a UE (e.g., UE 120 and/or the like) performs operations associated with SMTC compliant search and measurement scheduling.

As shown in FIG. 7, in some aspects, process 700 may include receiving SMTC information that identifies a periodicity of a plurality of SSB measurement occasions (block 710). For example, the UE (e.g., using antenna 252, DEMOD 254, MIMO detector 256, receive processor 258, controller/processor 280, and/or the like) may receive SMTC information that identifies a periodicity of a plurality of SSB measurement occasions, as described above.

As further shown in FIG. 7, in some aspects, process 700 may include performing at least one of an RRM operation or a BM operation on a group of SSBs based at least in part on whether the plurality of SSB measurement occasions overlap all SSBs of the group of SSBs (block 720). For example, the UE (e.g., using antenna 252, DEMOD 254, MIMO detector 256, receive processor 258, controller/processor 280, and/or the like) may perform at least one of an RRM operation or a BM operation on a group of SSBs based at least in part on whether the plurality of SSB measurement occasions overlap all SSBs of the group of SSBs, as described above.

Process 700 may include additional aspects, such as any single aspect or any combination of aspects described below and/or in connection with one or more other processes described elsewhere herein.

In a first aspect, when the plurality of SSB measurement occasions overlap all SSBs of the group of SSBs, performing at least one of the RRM operation or the BM operation on the group of SSBs further comprises performing one of the RRM operation or the BM operation on each SSB of the group of SSBs.

In a second aspect, alone or in combination with the first aspect, the RRM operation is performed on a first SSB of the group of SSBs and the BM operation is performed on a second SSB of the group of SSBs.

In a third aspect, alone or in combination with one or more of the first and second aspects, when the plurality of SSB measurement occasions overlap all SSBs of the group of SSBs, the method further comprises identifying one or more SSBs that are treated as non-overlapped with the plurality of SSB measuring occasions, wherein performing at least one of the RRM operation or the BM operation on the group of SSBs further comprises performing the RRM operation on one or more SSBs that are overlapped with the plurality of SSB measurement occasions; and performing the BM operation on the one or more SSBs that are treated as non-overlapped with the plurality of SSB measurement occasions.

In a fourth aspect, alone or in combination with one or more of the first through third aspects, identifying that one or more SSBs that are treated as non-overlapped with the plurality of SSB measuring occasions is based at least in part on a scaling factor applied to the periodicity of the plurality of SSB measurement occasions.

In a fifth aspect, alone or in combination with one or more of the first through fourth aspects, the BM operation comprises a serving-cell-only beam sweeping operation.

In a sixth aspect, alone or in combination with one or more of the first through fifth aspects, when at least one SSB, of the group of SSBs, does not overlap the plurality of SSB measurement occasions, the RRM operation is performed on one or more SSBs that are overlapped with the plurality of SSB measurement occasions.

In a seventh aspect, alone or in combination with one or more of the first through sixth aspects, the UE may receive an SSB, of the group of SSBs, that is non-overlapped with the plurality of SSB measurement occasions using a shared channel beam on a serving cell of the UE.

In an eighth aspect, alone or in combination with one or more of the first through seventh aspects, the SSB is associated with at least one of: radio link monitoring (RLM), beam failure detection (BFD), or beam failure recovery (BFR).

In a ninth aspect, alone or in combination with one or more of the first through eighth aspects, performing at least one of the RRM operation or the BM operation on the group of SSBs based at least in part on whether the plurality of SSB measurement occasions overlap all SSBs of the group of SSBs further comprises: performing the BM operation outside of a connected-mode discontinuous reception (C-DRX) ON duration; and performing a beam tracking operation during the C-DRX ON duration.

In a tenth aspect, alone or in combination with one or more of the first through ninth aspects, the group of SSBs are included in a synchronization signal burst set (SSBS).

In an eleventh aspect, alone or in combination with one or more of the first through tenth aspects, the RRM operation comprises a neighbor cell search.

In a twelfth aspect, alone or in combination with one or more of the first through eleventh aspects, an SSB, of the group of SSBs, that overlaps an SSB measurement occasion, of the plurality of SSB measurement occasions, is not frequency division multiplexed with data traffic in the SSB measurement occasion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving synchronization signal block (SSB) measurement time configuration (SMTC) information that identifies a periodicity of a plurality of SSB measurement occasions,
   wherein the plurality of SSB measurement occasions overlap all SSBs of a group of SSBs;
   identifying one or more SSBs that are treated as non-overlapped with the plurality of SSB measurement occasions based at least in part on a scaling factor applied to the periodicity of the plurality of SSB measurement occasions;
   performing a radio resource management (RRM) operation on one or more SSBs that are overlapped with the plurality of SSB measurement occasions;

performing a beam management (BM) operation on the one or more SSBs that are treated as non-overlapped with the plurality of SSB measurement occasions; and receiving an SSB, of the group of SSBs, that is non-overlapped with the plurality of SSB measurement occasions using a physical downlink shared channel (PDSCH) beam on a serving cell of the UE.

2. The method of claim 1, wherein the RRM operation is performed on a first SSB of the group of SSBs and the BM operation is performed on a second SSB of the group of SSBs.

3. The method of claim 1, wherein the BM operation comprises a serving-cell-only beam sweeping operation.

4. The method of claim 1,
wherein the shared channel beam comprises a physical downlink shared channel beam; and
wherein the SSB is multiplexed with downlink traffic.

5. The method of claim 1, wherein the SSB is associated with at least one of:
radio link monitoring (RLM),
beam failure detection (BFD), or
beam failure recovery (BFR).

6. The method of claim 1, further comprising:
performing the BM operation outside of a connected-mode discontinuous reception (C-DRX) ON duration; and
performing a beam tracking operation during the C-DRX ON duration.

7. The method of claim 1, wherein the group of SSBs are included in a synchronization signal burst set (SSBS).

8. The method of claim 1, wherein the RRM operation comprises a neighbor cell search.

9. The method of claim 1, wherein another SSB, of the group of SSBs, that overlaps an SSB measurement occasion, of the plurality of SSB measurement occasions, is not frequency division multiplexed with data traffic in the SSB measurement occasion.

10. A user equipment (UE) for wireless communication, comprising:
a memory; and
one or more processors coupled to the memory, the one or more processors configured to cause the UE to:
receive synchronization signal block (SSB) measurement time configuration (SMTC) information that identifies a periodicity of a plurality of SSB measurement occasions,
wherein the plurality of SSB measurement occasions overlap all SSBs of a group of SSBs;
identify one or more SSBs that are treated as non-overlapped with the plurality of SSB measurement occasions based at least in part on a scaling factor applied to the periodicity of the plurality of SSB measurement occasions;
perform a radio resource management (RRM) operation on one or more SSBs that are overlapped with the plurality of SSB measurement occasions;
perform a beam management (BM) operation on the one or more SSBs that are treated as non-overlapped with the plurality of SSB measurement occasions; and
receive an SSB, of the group of SSBs, that is non-overlapped with the plurality of SSB measurement occasions using a physical downlink shared channel (PDSCH) beam on a serving cell of the UE.

11. The UE of claim 10, wherein the RRM operation is configured to be performed on a first SSB of the group of SSBs and the BM operation is configured to be performed on a second SSB of the group of SSBs.

12. The UE of claim 10, wherein the BM operation comprises a serving-cell-only beam sweeping operation.

13. The UE of claim 10,
wherein the shared channel beam comprises a physical downlink shared channel beam; and
wherein the SSB is multiplexed with downlink traffic.

14. The UE of claim 10, wherein the SSB is associated with at least one of:
radio link monitoring (RLM),
beam failure detection (BFD), or
beam failure recovery (BFR).

15. The UE of claim 10, wherein the one or more processors are further configured to cause the UE to:
perform the BM operation outside of a connected-mode discontinuous reception (C-DRX) ON duration; and
perform a beam tracking operation during the C-DRX ON duration.

16. The UE of claim 10, wherein the group of SSBs are included in a synchronization signal burst set (SSBS).

17. The UE of claim 10, wherein the RRM operation comprises a neighbor cell search.

18. The UE of claim 10, wherein another SSB, of the group of SSBs, that overlaps an SSB measurement occasion, of the plurality of SSB measurement occasions, is not frequency division multiplexed with data traffic in the SSB measurement occasion.

19. A non-transitory computer-readable medium storing one or more instructions for wireless communication, the one or more instructions comprising:
one or more instructions that, when executed by one or more processors of a user equipment (UE), cause the one or more processors to:
receive synchronization signal block (SSB) measurement time configuration (SMTC) information that identifies a periodicity of a plurality of SSB measurement occasions,
wherein the plurality of SSB measurement occasions overlap all SSBs of a group of SSBs;
identify one or more SSBs that are treated as non-overlapped with the plurality of SSB measurement occasions based at least in part on a scaling factor applied to the periodicity of the plurality of SSB measurement occasions;
perform a radio resource management (RRM) operation on one or more SSBs that are overlapped with the plurality of SSB measurement occasions;
perform a beam management (BM) operation on the one or more SSBs that are treated as non-overlapped with the plurality of SSB measurement occasions; and
receive an SSB, of the group of SSBs, that is non-overlapped with the plurality of SSB measurement occasions using a physical downlink shared channel (PDSCH) beam on a serving cell of the UE.

20. The non-transitory computer-readable medium of claim 19, wherein the BM operation comprises a serving-cell-only beam sweeping operation.

21. The non-transitory computer-readable medium of claim 19, wherein the shared channel beam comprises a physical downlink shared channel beam; and
wherein the SSB is multiplexed with downlink traffic.

22. The non-transitory computer-readable medium of claim 19, wherein the RRM operation comprises a neighbor cell search.

23. The non-transitory computer-readable medium of claim 19, wherein the SSB is associated with at least one of:
radio link monitoring (RLM),
beam failure detection (BFD), or
beam failure recovery (BFR).

24. The non-transitory computer-readable medium of claim 19, wherein another SSB, of the group of SSBs, that overlaps an SSB measurement occasion, of the plurality of SSB measurement occasions, is not frequency division multiplexed with data traffic in the SSB measurement occasion.

25. An apparatus for wireless communication, comprising:
- means for receiving synchronization signal block (SSB) measurement time configuration (SMTC) information that identifies a periodicity of a plurality of SSB measurement occasions,
- wherein the plurality of SSB measurement occasions overlap all SSBs of a group of SSBs;
- means for identifying one or more SSBs that are treated as non-overlapped with the plurality of SSB measurement occasions based at least in part on a scaling factor applied to the periodicity of the plurality of SSB measurement occasions;
- means for performing a radio resource management (RRM) operation on one or more SSBs that are overlapped with the plurality of SSB measurement occasions;
- means for performing a beam management (BM) operation on the one or more SSBs that are treated as non-overlapped with the plurality of SSB measurement occasions; and
- means for receiving an SSB, of the group of SSBs, that is non-overlapped with the plurality of SSB measurement occasions using a physical downlink shared channel (PDSCH) beam on a serving cell of the apparatus.

26. The apparatus of claim 25, wherein the BM operation comprises a serving-cell-only beam sweeping operation.

27. The apparatus of claim 25, wherein the shared channel beam comprises a physical downlink shared channel beam; and
wherein the SSB is multiplexed with downlink traffic.

28. The apparatus of claim 25, wherein the RRM operation comprises a neighbor cell search.

29. The apparatus of claim 25, wherein the SSB is associated with at least one of:
- radio link monitoring (RLM),
- beam failure detection (BFD), or
- beam failure recovery (BFR).

30. The apparatus of claim 25, wherein another SSB, of the group of SSBs, that overlaps an SSB measurement occasion, of the plurality of SSB measurement occasions, is not frequency division multiplexed with data traffic in the SSB measurement occasion.

* * * * *